United States Patent
La Fleur

(10) Patent No.: US 6,812,302 B2
(45) Date of Patent: Nov. 2, 2004

(54) POLYMERIZING ALKYL ACRYLATE(S) IN PRESENCE OF AROMATIC INITIATOR TO FORM AROMATIC GROUP-TERMINATED LIQUID RUBBER

(75) Inventor: Edward Ewart La Fleur, Holland, PA (US)

(73) Assignee: Rohm and Haas Company, Philadelphia, PA (US)

( * ) Notice: Subject to any disclaimer, the term of this patent is extended or adjusted under 35 U.S.C. 154(b) by 140 days.

(21) Appl. No.: 10/174,011

(22) Filed: Jun. 18, 2002

(65) Prior Publication Data

US 2003/0022992 A1 Jan. 30, 2003

Related U.S. Application Data

(60) Provisional application No. 60/300,661, filed on Jun. 25, 2001.

(51) Int. Cl.$^7$ .............................. C08F 4/00; C08F 4/34; C08F 120/12; C08L 63/10
(52) U.S. Cl. ..................... 526/89; 525/107; 525/122; 525/131; 525/143; 525/163; 525/170; 525/176; 525/183; 525/217; 525/219; 525/228; 526/230.5; 526/231; 526/232; 526/307.7; 526/328; 526/329; 526/329.1; 526/329.2
(58) Field of Search .............................. 526/230.5, 231, 526/232, 89, 307.7, 328, 329, 329.1, 329.2; 525/107, 122, 131, 143, 170, 176, 183, 217, 219, 228

(56) References Cited

U.S. PATENT DOCUMENTS 4,460,746 A    7/1984   Fock et al. .................. 525/117
4,716,200 A  * 12/1987  Berghoff ..................... 525/111
6,306,546 B1 * 10/2001  LaFleur et al. .............. 429/324
2003/0050397 A1   3/2003  LaFleur

FOREIGN PATENT DOCUMENTS

FR        2385742        10/1978

OTHER PUBLICATIONS

Mulhaupt, R., "Flexibility or Toughness?—The Design of Thermoset Toughening Agents", Chimia 44 (1990), pp. 43–52.

* cited by examiner

Primary Examiner—Robert Sellers
(74) Attorney, Agent, or Firm—Marcella M. Bodner; Jeffrey H. Rosedale

(57) ABSTRACT

A process for preparing a liquid rubber composition comprises:
  (a) Forming a reaction mixture of
    (i) from 1.0 to 99.999 weight percent of the reaction mixture of at least one $C_1$–$C_{20}$ alkyl acrylate monomer; and
    (ii) from 0.001 to 20 weight percent of the reaction mixture of at least one aromatic-containing initiator;
  (b) charging the reaction mixture into a reactor maintained at a reaction temperature of up to 400° C.; and
  (c) polymerizing said monomer with said aromatic-containing initiator to form a liquid rubber with polymer chains having at least one non-functional aromatic end-group.

8 Claims, No Drawings

POLYMERIZING ALKYL ACRYLATE(S) IN PRESENCE OF AROMATIC INITIATOR TO FORM AROMATIC GROUP-TERMINATED LIQUID RUBBER

CROSS REFERENCE TO RELATED PATENT APPLICATION

This is a non-provisional application of prior pending U.S provisional application Ser. No. 60/300,661 filed on Jun. 25, 2001.

BACKGROUND

The present invention relates to new toughened thermoset compositions. The present invention also relates to new compositions for toughening thermoset compositions. The present invention also relates to processes for preparing new tougheners for thermoset compositions. The present invention also relates to composite materials and articles which contain the new toughened thermoset compositions.

Many advanced composite materials are used in high-performance structural materials which have high heat resistance. These materials find wide use in the construction, electronic, automotive, computer, aerospace, and electrical industries. Many of these advanced composite materials are based on the thermal curing ("thermosetting") of liquid resin formulations. These liquid resin formulations often contain various components for forming rigid highly crosslinked polymeric matrices.

Unfortunately, it is well known that rigid highly crosslinked polymeric matrices are brittle and have poor impact strength. Various toughening agents have been developed over the years for toughening thermoset materials. Functional toughening agents have been incorporated in thermoset materials as small rubbery particles. Presently, small rubbery particles are incorporated in thermosets either by premixing rubber particles (e.g., core-shell polymer particles) into the thermoset liquid resin prior to curing, or by formation of rubbery microdomains upon curing of the thermoset liquid formulation.

One of the most important type of toughening agents that is widely used in thermosetting structural materials is the class of Liquid Rubbers ("LR"). LRs that are commonly used for toughening thermoset resins have low viscosities and tend to be miscible in the uncured liquid resin formulations. The LRs typically phase separate upon curing (crosslinking) of the thermoset resins to form rubbery microdomains in the crosslinked polymeric matrix of the thermosetting resin. These rubbery microdomains help to toughen the rigid crosslinked polymeric matrix while maintaining heat resistance and dimensional stability of the matrix. Various types of LRs are disclosed in Mulhaupt, R., "Flexibility or Toughness?—The Design of Thermoset Toughening Agents", Chimia 44 (1990), pp. 43–52.

An important design parameter of a LR for toughening thermoset resins is its molecular weight. While phase separation and toughness typically improve with increasing molecular weight of the LR, compatibility between the LR and the uncured liquid thermoset resins typically improves with decreasing molecular weight. Ideally, the LR is miscible (i.e. forms a single phase) in the uncured liquid thermoset resin because single phase liquid thermoset resin formulations have lower viscosities than multi-phase liquid thermoset resin formulations. Because multi-phase liquids tend to exhibit complex Theological behavior compared to single-phase liquids, miscible thermosetting resin formulations tend to have better processing characteristics than immiscible, multi-phase, liquid thermoset resin formulations.

Most, if not all, known LRs for toughening thermoset resins contain functional groups. It is generally believed that these functional groups are required to enhance the interfacial adhesion of the phase separated rubbery domain to the crosslinked polymeric matrix. Often this interfacial adhesion is enhanced by covalent chemical bonding between the functional groups of the LRs and the functional groups of the crosslinkable polymer resin. Often the functional groups of the LRs are located at the ends of polymer chains, denoted "terminally functional" or "functionally terminated" LRs.

Commercially-available functionally terminated LRs include carboxy-terminated copolymers of butadiene and acrylonitrile monomers, known as "CTBN" resins, and amino-terminated copolymers of butadiene and acrylonitrile monomers, known as "ATBN" resins. Similar copolymers end-functionalized with vinyl groups and epoxy groups are also known as "VTBN" and "ETBN", respectively. It is known that the carboxylic acid and amine functional groups of these LRs enhance their miscibility in uncured epoxy resins. In addition, their terminal functional groups tend to increase the molecular weight of the polymer chains in the rubbery microdomains during curing, which also tends to improve impact strength.

Of the two common thermosetting resins, epoxy and unsaturated polyester, the epoxy resins have proved to be amenable to toughening by low levels of either liquid carboxyl-terminated butadiene acrylonitrile copolymer (CTBN) or amino-terminated butadiene acrylonitrile copolymer (ATBN). These liquid rubbers are effective in improving the crack resistance and impact strength while minimally effecting the heat distortion properties of the normally brittle epoxy resins. The enhancement in crack resistance and impact strength is brought about by the formation of a discrete rubbery phase during the curing of the epoxy resin. The size of the particles that constitute this phase is usually between 0.1 and 5 $\mu$m.

Unfortunately, there are several problems associated with terminally-functional LRs. One problem is that end-functionalized polymer chains of liquid rubbers tend to react and crosslink, thereby increasing molecular weight, viscosity, and reducing miscibility. This problem is particularly severe among polymers that have reactive functional groups at each end of the polymer chain. Another problem is that the presence of terminal functional groups cause the LR to react prematurely with the liquid thermoset resins prior to cure. This also causes viscosity increases and/or reduced miscibility (phase separation) of the LR/thermoset resin liquid blend which makes processing difficult. Similar problems with increased viscosity also result from strong interactions between end-functionalized polymer chains and reactive groups on the thermosetting resins.

Another problem is that while CTBN and ATBN LRs are available for preparing miscible LR-modified epoxy liquid thermoset resins, no such LR is presently known that is both miscible in the uncured state and immiscible in the cured state with unsaturated polyester ("UP") and epoxy vinyl ester thermoset resins. Unlike the epoxy resins, the incorporation of low levels of CTBN and/or ATBN LRs into unsaturated polyester resins results in negligible improvement in crack resistance and impact strength at the expense of reducing the heat distortion characteristics of the cured resin matrix.

The aforementioned problems thereby preclude the use of such blends, especially those based on unsaturated polyester thermoset resins, in processing operations that require low viscosities, such as pultrusion, resin transfer molding, and spray-up.

Moreover, when preparing LR/thermoset liquid resin blends, the end-user must carefully measure and mix these individual components. This hinders the preparation of "one-pack" LR/thermoset liquid resin blends.

In view of the above problems, the composites and thermoset resin industry would greatly welcome the preparation of LRs and LR/thermoset liquid resin blends that: (a) remain miscible in the uncured state over time; (b) provide low viscosity and easy processability; (c) are chemically stable; and (d) toughen the cured thermoset resin with minimal decrease in heat and dimensional stability. The composites and thermoset resin industry would especially welcome the development of a LR that overcomes these problems in unsaturated polyester thermoset resins.

Accordingly, one object of the present invention is to provide LRs that: (a) remain miscible in uncured thermosetting liquid resins over long periods of time; (b) provide low viscosity and easily processable liquid resin thermoset blends; (c) are chemically stable; and (d) phase separate during cure for toughening the cured thermoset resin, which overcome the aforementioned problems.

Another object of the present invention is to provide efficient processes for preparing LRs that overcome the aforementioned problems.

Another object of the present invention is to provide uncured liquid thermoset resin blends, especially those based on unsaturated polyesters, with LRs that overcome the aforementioned problems.

Another object of the present invention is to provide composite materials made by curing liquid thermoset resin blends that overcome the aforementioned problems.

These and other objects, which will become readily apparent to those skilled in the art after reading this specification, have been accomplished by inventing new liquid rubber compositions that comprise polymer chains having a glass transition temperature less than 25 C and at least one non-functional aromatic terminal end-group. We have heretofore discovered that liquid rubbers that are ordinarily immiscible in liquid thermoset resins can be made miscible by the addition of at least one non-functional aromatic end-group to the polymer chains of such liquid rubber compositions. In addition, these new liquid rubber compositions can be controlled to phase separate into rubbery microdomains upon curing of thermoset resins, including unsaturated polyester thermoset resins. The resulting new composite materials are found to improve the fracture toughness of cured thermoset resins while maintaining dimensional and heat resistance.

STATEMENT OF INVENTION

In a first embodiment of the present invention, there is provided a single phase uncured thermoset composition, comprising:
  a) at least one uncured thermoset resin; and
  b) at least one liquid rubber comprising polymer chains having a glass transition temperature less than 25 C, said polymer chains having at least one non-functional aromatic terminal end-group.

In a second embodiment of the present invention, there is provided a polymeric composition for cured thermoset resins, said polymeric composition comprising:
  polymer chains having a glass transition temperature less than 25 C, said polymer chains comprising at least one non-functional aromatic terminal end-group;
  wherein said polymeric composition is both miscible in the uncured state of said thermoset resins and immiscible in the cured state of said thermoset resins.

In a third embodiment of the present invention, there is provided a process for preparing a liquid rubber composition for a cured thermoset resin, wherein said liquid rubber composition is characterized as being miscible in the uncured state of said thermoset resin and immiscible in the cured state of said thermoset resins, said liquid rubber composition comprising polymer chains having at least one non-functional aromatic terminal end-group, a weight average molecular weight of at least 500 g/mol, a glass transition temperature less than 25 C, the process comprising the steps of:
  (a) forming a reaction mixture, said reaction mixture comprising:
    (i) from 1.0 to 99.999 weight percent of the reaction mixture of at least one $C_1$–$C_{20}$ alkyl acrylate monomer; and
    (ii) from 0.001 to 20 weight percent of the reaction mixture of at least one aromatic-containing initiator;
  (b) charging the reaction mixture into a reactor maintained at a reaction temperature up to 400 C;
  (c) initiating polymerization of said monomer with said aromatic-containing initiator to form a reaction product containing said polymer chains; and
  (d) providing a reaction residence time sufficient for the polymer chains to form.

In a fourth embodiment of the present invention, there is provided a process for preparing a liquid rubber composition for a cured thermoset resin, said liquid rubber composition is characterized as being miscible in the uncured state of said thermoset resin and immiscible in the cured state of said thermoset resins, said liquid rubber composition comprising polymer chains having at least one non-functional aromatic terminal end-group, a weight average molecular weight of at least 500 g/mol, a glass transition temperature less than 25 C, the process comprising the steps of:
  (a) forming a reaction mixture, said reaction mixture comprising:
    (i) from 1 to 99.999 weight percent of the reaction mixture of at least one $C_1$–$C_{20}$ alkyl acrylate monomer; and
    (ii) from 0.001 to 99 weight percent of the reaction mixture of at least one aromatic-containing solvent;
  (b) charging the reaction mixture into a reactor maintained at a reaction temperature within the range of from 200 C to 500 C;
  (c) thermally-initiating polymerization of said monomer to form a reaction product containing said polymer chains; and
  (d) providing a reaction residence time sufficient for the polymer chains to form.

In a fifth embodiment of the present invention, there is provided a composite material, comprising:
  a) at least one cured thermoset resin matrix; and
  b) rubbery domains dispersed in said matrix, said rubbery domains comprising:
    polymer chains having a glass transition temperature less than 25 C and having at least one non-functional aromatic terminal end-group.

In a sixth embodiment of the present invention, there is provided a process for preparing single phase uncured thermoset composition, the process comprising the steps of mixing:
  a) at least one uncured thermoset resin; and
  b) at least one liquid rubber, said liquid rubber comprising polymer chains having at least one non-functional aromatic terminal end-group, said polymer chains having a weight average molecular weight of at least 500 g/mol, and said polymer chains characterized as having a glass transition temperature less than 25 C.

DETAILED DESCRIPTION

The term "LR" used herein stands for "liquid rubber".

The term "miscible" used herein is intended to mean that the liquid rubber and the uncured thermoset resin blend remain in a single liquid phase over extended periods of time according to the principles of thermodynamics.

The term "immiscible" used herein is intended to mean not miscible.

The term "phase separated" used herein refers to matter having two or more distinct phases according to the principals of thermodynamics.

The term "xC", where x is a number refers to the temperature x in units of degrees Celsius.

The term "parts" used herein is intended to mean "parts by weight". Unless otherwise stated, "total parts by weight" do not necessarily add to 100.

The term "weight percent" used herein is intended to mean "parts by weight per hundred".

The term "alkyl" used herein refers to linear, branched and cyclic saturated hydrocarbon chemical groups.

The term "$C_N$ alkyl", where N is a number, refers to saturated alkyl groups comprised of N carbon atoms.

The term "(meth)acrylate" used herein refers to both "acrylate" and "methacrylate".

The term "molecular weight" used herein refers to weight average molecular weight.

The term "daltons" and "g/mol" used herein refers to "grams per mole".

All ranges disclosed herein are inclusive and combinable.

The invention disclosed herein pertains, in part, to the development of new miscible blend compositions of liquid rubbers and uncured thermoset resins. It has been discovered that new miscible blend compositions of liquid rubbers and uncured thermoset resins provide improved viscosity characteristics for improved processing of rubber-modifier thermoset resins. These new miscible blend compositions also provide improved toughening in resulting thermoset composite materials with minimal reduction in heat and dimensional stability.

The liquid rubbers of the present invention are composed of flexible polymer chains that have at least one non-functional aromatic terminal end-group. While polymer chain flexibility is provided for by ensuring that the glass transition temperature (Tg) of the polymer chains is less than 25 C, it is often typical that the Tg will be less than 10 C, more typically less than 0 C, even more typically less than −20 C, and further typically less than −40 C.

The at least one non-functional aromatic terminal end-group modifies the solubility characteristics of the flexible polymer chains to make the chains miscible in common liquid thermoset resins. In contrast, the flexible polymer chains absent at least one aromatic end-group are typically immiscible in common liquid thermoset resins.

Non-functional aromatic terminal end-groups can be provided during the polymerization process by various methods. One method involves initiating the polymerization of one or more types of monomers for making the polymer chains with an aromatic-containing initiator in which a non-functional aromatic fragment of the initiator molecule resides at one or more polymer chain ends. Typical "chain polymerization" methods include free-radical polymerization and anioic polymerzation which "grow" the chain end by addition of subsequent monomer units.

Another method to provide non-functional aromatic terminal end-groups involves chain transfer and/or termination of the growing polymer chain end to an aromatic-containing molecule during chain polymerization. A number of aromatic chain transfer and chain termination agents are known, such as those reported in *The Polymer Handbook, 3rd. Ed., Edited by Brandrup and Immergut, John Wiley Publishers, New York,* 1989.

Non-functional aromatic terminal end-groups can also be provided by chain transfer of free radical polymer chain ends to aromatic-containing solvent molecules. While chain transfer to solvent in solution polymerizations may occur at nearly all conditions that accommodate polymerization, solvent-based chain transfer typically occurs with increasing frequency as reaction temperature and pressure increases.

While any aromatic solvent that is liquid at reaction temperatures may be used, typical aromatic-containing solvents include benzene and naphthylene, as well as the class of n-alkyl benzenes such as isopropyl benzene, ethyl benzene, toluene, and the class of n-alkyl naphthylenes such as isopropyl naphthylene, where n=1 to 20. Aromatic-containing mineral oils may also be provided in the solvent blend. One or more non-aromatic co-solvents may also be blended with the aromatic solvent as long as chain transfer to the aromatic solvent occurs more often than chain transfer to the non-aromatic co-solvent. Mixtures of two or more aromatic-containing solvents can also be blended, optionally with non-aromatic co-solvents. In solvent blends, the weight percentage of the aromatic solvent to total solvent should be greater than 20, more typically greater than 40, even more typical greater than 60, and most typically greater than 80 weight percent. In cases where the chain transfer coefficient of one or more aromatic solvents is much greater than that of non-aromatic solvents, then the weight percentage of the aromatic solvent can be less than 20 weight percent.

Polymer molecular weight also decreases as the overall frequency of chain transfer increases in free radical chain polymerizations. Accordingly, free-radical chain polymerization of flexible polymers in aromatic-containing solvents at conditions of high pressure and temperature is conducive for preparing flexible polymers having molecular weights up to 20,000 g/mol. Moreover, the resulting flexible polymers contain at least one non-functional aromatic terminal end-group.

Although one non-functional aromatic terminal end-group is sufficient for improving the miscibility of flexible polymer chains in uncured thermoset resins, it is typical that the polymer chains contain more than one non-functional aromatic terminal end-group. Two such aromatic end-groups can be provided by using an aromatic-containing free radical initiator during the polymerization of the LR's polymer chains in aromatic solvent. Thus, some or all of the polymer chains can be both initiated and terminated with an aromatic-containing molecule.

The polymer chains of the liquid rubbers of the present invention have at least one non-functional aromatic end-group. Where the polymeric chains are linear chains having two ends, it is more typical that both ends comprise non-functional aromatic end-groups.

Advanced polymeric architectures (such as graft copolymers, block copolymers, comb polymers, star polymers, starburst polymers, etc.) each having two or more polymer chains or chain fragments are also envisioned. In the case of advanced polymeric architectures such as these, it is typical that up to all of the chain ends can contain non-functional aromatic end-groups.

The liquid rubber compositions of the present inventions may further comprise other polymer chains that do not have at least one non-aromatic end-group. In these embodiments, the overall average number of non-functional aromatic end-groups per polymer chain in the liquid rubber composition may be less than 1. In these instances, improved liquid rubber miscibility in thermoset resins in the uncured state will occur when the overall average number of non-functional aromatic end-groups per polymer chain in the liquid rubber composition is at least 0.2, typically at least 0.4, more typically at least 0.5, and even more typically at least 0.7.

The weight percentage of the non-functional aromatic end-groups is typically between 1 and 20 weight percent based on the total liquid rubber composition weight. If this weight percentage is less than 1 percent then the liquid rubber composition will tend not to be miscible in the uncured thermoset resin. If this weight percentage is greater than 20 weight percent then the polymer chains will not properly phase separate into rubbery microdomains upon curing of the thermoset resin.

While any aromatic-containing free radical initiator can be used to prepare the LRs using free radical polymerization, in certain embodiments of the present invention it is typical to use such initiators from the class of aromatic-containing hydrocarbon initiators.

Aromatic-containing hydrocarbon initiators contain primarily carbon and hydrogen atoms and at least one aromatic group. We have found that LRs prepared with conventional initiators containing oxygen (e.g., organic peroxides) are not as miscible in thermoset resins as are LRs prepared with hydrocarbon initiators. Aromatic hydrocarbon initiators which are useful include the various alkyl-substituted diphenyl compounds having the following general structure:

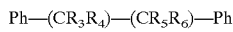

Ph—(CR$_3$R$_4$)—(CR$_5$R$_6$)—Ph in which Ph are separately phenyl groups, and R$_3$, R$_4$, R$_5$, and R$_6$ each represent a hydrogen or an alkyl group, at least two of R$_3$, R$_4$, R$_5$, and R$_6$ being alkyl groups, and in which the phenyl groups are unsubstituted or contain alkyl substituents. When R$_3$ and R$_5$ are methyl groups and R$_4$ and R$_6$ are ethyl groups, the resulting compound is known as 3,4-dimethyl-3,4-diphenylhexane. When R$_3$, R$_4$, R$_5$, and R$_6$ are methyl groups, the resulting compound is known as 2,3-dimethyl-2,3-diphenylbutane. Both 3,4-dimethyl-3,4-diphenylhexane and 2,3-dimethyl-2,3-diphenylbutane are typically used in the processes of the present invention.

Examples of other aromatic-containing free radical initiators include the class of di-aromatic hydrocarbon initiators such as oil-soluble di-aromatic-peroxide initiators such as dicumyl peroxide, dibenzyl peroxydicarbonate, and 2,4-dichlorobenzoyl peroxide.

Other aromatic hydrocarbon initiators which are useful include the various haloalkyl-substituted-, and alkyl-substituted diaryl compounds having the following general structure:

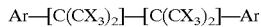

Ar—[C(CX$_3$)$_2$]—[C(CX$_3$)$_2$]—Ar where Ar represents an aryl group and X a halogen atom or a hydrogen atom. Such diaryl compounds can, accordingly, contain up to 12 halogen atoms, or up to 12 hydrogen atoms, and typically have from 1 to 5 halogen atoms per molecule. The aryl groups can be substituted or unsubstituted and include phenyl, biphenyl, naphthyl, bihenyl, or anthracenyl groups. X can be fluorine, bromine, iodine, and is typically chlorine.

LRs are also suitably prepared using anionic polymerization techniques known in the art. In anionic polymerization, the LR polymer chains may be suitably initiated with an aromatic-containing Group I metal initiator such as phenyllithium. Molecular weight and chemistry of the polymer chain end is readily controlled through methods known in the anionic polymerization art.

Chain termination is theoretically non-existent during anionic polymerization. Accordingly, aromatic-containing terminating agents, such as phenol, can be used to terminate the living anioic polymer chain ends, with an aromatic group. In addition, molecular weight is readily controlled using anionic techniques as the molecular weight is determined by the ratio of weight of polymerized monomer to the number of moles of initiator used.

The non-functional aromatic end-groups can also be provided by post-reaction of the flexible polymer chains with an aromatic-containing molecule. In free radical chain polymerization of ethylenically unsaturated monomer often the terminating chain end will be unsaturated. Subsequent reaction of an aromatic-containing molecule that reacts with the unsaturated chain end will result in the polymer chain having an non-functional aromatic end-group.

For the purposes of maximizing polymer chain flexibility the weight fraction of "low-Tg" monomer units of the polymer chains should be as high as possible. Accordingly, the low-Tg monomers typically comprise at least 20, more typically at least 40, even more typically at least 60, and most typically at least 80 weight percent of the polymerized units of the liquid rubber polymer chains. The balance weight fraction of the flexible polymer chains can compose various co-monomers, initiator fragments, chain transfer agents, solvent fragments, functional terminal groups, non-functional terminal groups, coupling agents, crosslinkers, and other polymeric chain fragments such as polymer chains having a glass transition temperature of at least 25 C.

"Low-Tg" monomers are typically selected from the following group: C1 to C20 alkyl acrylate monomers such as butyl acrylate ("BA"), ethyl acrylate, n-octyl acrylate, and 2-ethylhexyl acrylate; diene monomers such as butadiene and isoprene; siloxane monomers such as dimethylsiloxane, vinyl acetate monomers; and copolymers thereof. The C1–C8 alkyl acrylates are particularly preferred for providing liquid rubbers that are stable against light and heat degradation.

However, under certain circumstances if the weight fraction of the low Tg monomers are too high, miscibility problems can occur. Accordingly, in instances where miscibility in unsaturated polyester resins is sought, it is desirable that the weight fraction of the C1 to C20 alkyl acrylate monomers typically comprise no more than 75, more typically no more than 65, even more typically no more than 55, and most typically no more than 40 weight percent of the polymerized units of the liquid rubber polymer chains, with the balance primarily comprising additional monomer units that improve solubility. Methyl methacrylate ("MMA") is such an additional monomer that improves solubility.

Various co-monomers that may also be incorporated in the polymer chains include one or more ethylenically unsaturated monomers from one or more of the following monomer classes: (meth)acrylic acids; (meth)acrylonitriles; (meth)acrylamides; 2-(perfluoroalkyl)ethyl (meth)acrylates;

2-(perhaloalkyl)ethyl (meth)acrylates; alkyl (meth) acrylates, alkyl groups are C1 to >C20, may be substituted; alkyl(ethyleneoxy)n (meth)acrylates; amino (meth) acrylates; aryl (meth)acrylates including multiple rings and substituted rings; conjugated dienes; silanes; siloxanes; vinyl aromatics, including multiple rings and substituted rings; vinyl benzoic acids; vinyl ester; vinyl ethers; vinyl halides; vinyl phosphoric acids; vinyl sulfonic acids; vinylic anhydrides; vinylidene halides; fluorophenyl (meth) acrylates; and vinyltrimethylsilanes.

The various co-monomers are typically selected from the group of: vinyl aromatic (e.g., styrene), alkyl methacrylic (e.g., methyl methacrylate), and acrylonitrile monomers. These co-monomers help to adjust the solubility of the liquid rubber in the uncured liquid thermoset resins.

The presence of vinyl end-groups on the LR polymer chains tend to increase miscibility and/or reactivity with the thermosetting resins. In certain embodiments where the LR polymer chain end contains a vinylic unsaturated end group, it is desirable to saturate at least a portion, typically at least 50%, and more typically at least 75% of these unsaturated end groups. Accordingly, LRs having fewer vinylic unsaturated end groups will typically phase separate more thoroughly upon cure of the thermoset resin/LR blend composition than the corresponding blend in which the LR is more unsaturated end groups.

The polymer chains may further comprise polymerized units capable of crosslinking as the thermoset resin cures. Crosslinking of the polymer chains will help increase the rubber molecular weight during cure. When desired, the amount of such polymerizable crosslinking agents are typically present in an amount from 0.1 to 15 weight percent, more typically from 0.5 to 10 weight percent, and more typically from 1 to 7.5 weight percent, based on total weight of the polymer chains. Crosslinking agents provide two advantages: (1) they typically increase the degree of phase separation of the LR during cure which typically increases rigidity of the cured thermoset material, and (2) they typically increase the molecular weight of the polymer chains of the rubbery microdomains which typically increases impact strength of the cured thermoset material.

Suitable polymerizable crosslinking agents are incorporated between the ends of the LR polymer chains and crosslink upon cure of the thermoset/LR blend.

One or more polymerizable crosslinking agents are optionally incorporated into the LR polymer chain and are selected for their copolymerizability with the monomer(s) and for their utility to further crosslink the LR when the LR/thermoset resin blend is cured. As "curable" monomers, the polymerizable crosslinking agents are typically ethylenically unsaturated compounds with an additional "reactive" component. Examples of functionally reactive comonomers useful in the invention include, but are not limited to, hydroxyethyl (meth)acrylate, 2-hydroxypropyl (meth)acrylate; glycidyl (meth)acrylate.

While any of the aforementioned polymerizable crosslinking agent may be used, typical polymerizable crosslinking agents include the class of ethylenically unsaturated monomers that undergo hydrolysis followed by condensation. such polymerizable crosslinking agents include the group of alkoxysilane monomers such as 2-methacryloxyethyl-trimethoxysilane, 3-methacryloxypropyl-trimethoxysilane ("MATS"), and 3-acryloxypropyl-trimethoxysilane. Useful weight ratios of the sum of monomer(s) to the polymerizable crosslinking agent(s) in the LR polymer chains are from about 80/20 to 99.9/0.1; when the polymerizable crosslinking agent is a silane, typical use ratios are from about 90/10 to about 98/2, and most typically 94/6 to 98/2.

The polymer chains of the liquid rubbers of the present invention have molecular weights that provide viscosities that are comparable to, and typically less than, the viscosities of the liquid thermoset resins with which they are blended. The molecular weight of the liquid rubber's polymer chains are also selected to be relatively low, which renders them miscible in liquid thermoset resins. The polymer chain molecular weight is typically less than 20,000 g/mol, more typically less than 10,000 g/mol, even more typically less than 5,000 g/mol, and most typically less than 3,000 g/mol.

In contrast, liquid rubbers having a molecular weight lower than 500 g/mol will tend not to phase separate on cure. Liquid rubbers that do not properly phase separate tend to substantially decrease the thermal dimensional stability by lowering the glass transition temperature of the matrix resin of the cured thermoset article. Accordingly, the polymer chain molecular weight will at least be 500 g/mol, more typically least 750 g/mol, and even more typically at least 1,000 g/mol.

Various chain polymerization processes such as free radical polymerization and anionic polymerization are capable of providing the polymer chains of the liquid rubbers of the present invention. In both processes, the common steps include: forming a reaction mixture of at least one $C_1$–$C_{20}$ alkyl acrylate monomer and at least one aromatic-containing initiator; charging the reaction mixture into a reactor maintained at a reaction temperature up to 400 C; initiating polymerization of the monomer with the aromatic-containing initiator to form a reaction product containing the liquid rubber polymer chains; and providing a reaction residence time sufficient for the polymer chains to form. For most processes, reaction residence times will typically be less than 1000 minutes.

The amount of the alkyl acrylate monomer in the reaction mixture can be in the range of from 1.0 to 99.999 weight percent based on total weight of the reaction mixture. Typically, the amount of monomer will be at least 10 weight percent, more typically at least 20 weight percent, and even more typically at least 30 weight percent of the reaction mixture.

The amount of aromatic-containing initiator is in the range of from 0.001 to 99 weight percent based on total weight of the reaction mixture. Typically, for free radical initiators, the amount will be at least 0.01 weight percent, more typically at least 0.05 weight percent, even more typically at least 0.15 weight percent, and most typically at least 0.50 weight percent based on total weight of the reaction mixture. Typically, for anionic initiators, the amount will be at least 0.001 weight percent, more typically at least 0.005 weight percent, even more typically at least 0.015 weight percent, and most typically at least 0.050 weight percent based on total weight of the reaction mixture.

Optionally, solvent may be used in the reaction mixture. Any solvent that is soluble with the monomers, initiators, and polymer chains will be suitable. Typically, an aromatic solvent is used as described earlier. The amount of optional solvent used is no more than 90 weight percent, preferably no more than 80 weight percent, more preferably no more than 70 weight percent, and most preferably no more than 60 weight percent of the total reaction mixture.

Any suitable reactor known in the chemical processing art, such as batch, semi-batch, continuous flow stirred tank reactors ("CFSTRs"), plug flow tubular reactors ("PFTRs"), and combinations thereof, can be used for making the LRs of the present invention. While any reactor can be used, both CFSTRs and PFTRs are particularly suitable for providing commercially efficient processes. In batch reactors reactants are added, the reaction proceeds, and then the products are removed. In semi-batch reactors the reactants are added continuously while the reaction proceeds, and then the products are removed. In continuous reactors the reactants are added and the products are removed simultaneously.

The design of reactors suitable for the processes of the present invention will suitably provide reaction temperatures up to 500 C and operating pressures often in excess of 100 psi. In most reactors other than PFTRs, reaction pressures should be able to reach 2000 psi, while PFTRs can be operated at temperatures in excess of 2000 psi, often as high as 5000 psi. Good mixing is also a requirement of most reactors, except for PFTRs. Mixing can be accomplished by many methods known in the chemical processing arts, as described in *The Chemical Engineer's Handbook*, 5th Edition, Ch. 19, Ch. 21 McGraw-Hill (1973).

The reaction mixture containing the monomer, aromatic-containing initiator, optional solvent, and other optional chain end modifiers is charged, either batch-wise or continuously, into a suitable reactor. The reaction temperature is maintained at a temperature less than 400 C, typically less than 300 C. Also, in free-radical chain polymerizations, the reaction temperatures are typically above 100 C, and more typically above 200 C.

In free-radical chain polymerizations the molecular weight of the polymer tends to vary with reaction temperature; below 100 C typically provides polymers having a molecular weight higher than 20,000 g/mol. As reaction temperatures exceeds about 400 C, side reaction products become more prevalent so that the quality of the product may be compromised.

In anionic polymerizations, the reaction temperatures are typically less than 200 C, more typically less than 150 C, and even more typically less than 100 C.

The reaction temperature can be sufficiently attained by heating coils immersed within the reactor and/or around the outside of the reactor in the form of a heat jacket.

The reaction pressure in an enclosed system is a function of residual vapor pressure of unreacted monomer and other volatiles present either in the feed (such as solvent), in the reaction mixture, and/or produced as side reaction products. Although the process is carried out under a positive pressure, the reaction pressure appears to have no significant effect on the yield.

At higher temperatures, the higher gas pressures which result may require special equipment and procedures for safe handling. Because a number of the acrylic monomers are vapors above 200° C. and atmospheric pressure, suitable reactors are typically constructed of materials (e.g., stainless steel) that can withstand high pressures, such as up to 10 MPa.

The reaction residence time in batch reactors is typically controlled by the time allowed for the reaction to occur. In continuous reactors, the reaction residence time is typically controlled by rate of flow of the reaction mixture through the reactor and the reaction volume of the reactor. The reaction residence time is commonly defined as the ratio of the reaction volume to the volumetric flow rate of the reaction mixture. This residence time describes the average amount of time that the reaction mixture spends inside the continuous reactor.

It has been found that at a given temperature, the molecular weight of the LR polymer product generally increases as the residence time increases. It has also been found that degraded side-reaction products increases as the residence time increases. While the residence time in the reaction zone may be as long as 1000 minutes at lower reaction temperatures, normally discoloring reaction by-products and other side reactions will dictate that shorter residence times be employed.

It has also been found that while these reaction conditions suitably prepare LRs having at least one non-aromatic end group per polymer chain, not all of the polymer chains may be initiated and terminated in the same fashion. Accordingly, a portion of the polymer chains made according to these processes may have no non-functional aromatic end-groups. In these instances, the average number of non-functional aromatic end-groups per polymer chain in the liquid rubber composition, on average, could be less than one. It should be appreciated that the liquid rubber compositions of the present invention may further comprise other such polymer chains that do not have at least one non-aromatic end-group.

The residence time for most free-radical chain polymerizations is suitably in the range of from about 1 to 100 minutes, and typically, from about 5 to about 50 minutes. In general, longer residence times may increase the yield of product, but the rate of increase of product yield is generally very slow after about 60 minutes of reaction.

The residence time for anionic chain polymerizations varies widely, and depends on a number of factors, including degree of conversion, propagation rate, temperature, solvent type, monomer concentration, and type of initiator. While any residence time is possible, the residence time for anionic chain polymerizations is typically in the range of from 1 to 1000 minutes, and is suitably less than 500 minutes for commercially efficient processes.

In continuous reactors, the desired flow rate selected will depend upon the reaction temperature, constituents, desired molecular weight of product, desired molecular weight distribution, and the particular equipment employed. To produce a given LR polymer of a desired molecular weight with low residual monomer, the reaction temperature and residence times are mutually manipulated in accordance with the principles provided herein.

In processes using CFSTRs, the reactor is typically well-mixed to maintain a narrow distribution of residence times of flow elements to generate a homogeneous reaction product. Having a well-mixed CFSTR helps to ensure homogeneity in the LR polymer product. CFSTRs that are not well-mixed may develop "dead-zones" or areas within the CFSTR from which the reaction mixture is unable to flow and exit the CFSTR. Reaction mixtures in such "dead-zones" may have exceedingly long residence times within the CFSTR, which results in undesirably high molecular weight and degraded reaction products.

The presence of "dead-zones" arising from a poorly mixed CFSTR also results in poor heat transfer leading to "hot-spots" which may also lead to undesirably high molecular weight and degraded reaction products. Sufficient mixing is generally accomplished by using a series of evenly spaced impeller blades on a mixing shaft that rotates rapidly inside the CFSTR. It is also desirable to include baffles inside the walls of the CFSTR to aid mixing.

The present process is adapted to achieve yields, without recycle, of at least about 15% of theoretical. With proper selection of reaction parameters and monomers in accordance with the detailed description of the invention provided, yields between 25% and 90% are regularly achieved. Generally, percent weight of monomer converted to LR polymer increases with decreasing reaction residence times.

Unreacted monomer, initiator, and optional solvent may be readily removed from the reaction product by distillation techniques known in the art.

For increased efficiency, unreacted monomer may be recovered from the reactor by any suitable means known in the art, such as by distillation, and recycled into the reactor.

In one embodiment of the present invention, the process uses a variable filling type stirred CFSTR for the polymerization of monomers to LR polymers having a narrow-molecular weight distribution by the proper balancing of the conditions of polymerization and flow rates. The reactor may include a CFSTR of any type adapted for variable filling operation of from as low as 10 to 100% of the usable volume thereof for the production of LR polymers. This CFSTR may be either horizontal or vertical and typically has provision for close control of the temperature therein by any desired means, including control by a cooling jacket, internal cooling coils or by withdrawal of vaporized monomer followed by condensation thereof and return of the condensed monomer to the reaction zone.

It will be apparent to those skilled in the art that the reactor used in this embodiment can, if desired, be constituted by a plurality of CFSTRs operated in series. Likewise, it will be apparent that such reactor may include more than one CFSTRs operated in parallel, if it is desired to employ several relatively small reactors to supply the capacity of the final reaction zone rather than a single large reactor for that purpose.

A CFSTR which has been found quite suitable for carrying out the process is a tank reactor provided with cooling coils sufficient to remove any heat of reaction not taken up by raising the temperature of the continuously charged reaction mixture so as to maintain a preselected temperature for polymerization therein. Typically such a CFSTR will be provided with at least one and usually more, vaned agitators driven by an external power source, such as a motor. At least one such agitator is positioned to provide agitation of liquid contained in the reactor while operating at minimum filling, i.e., as low as 10% of the volume thereof.

In operating the present process, flexibility and range of choice can be realized in polymer types produced, as well as in the production rate thereof, by proper choice of polymerization reaction conditions.

In certain embodiments, the reaction mixture is charged to the reactor and the temperature of the monomer feed is raised up to 500° C. to induce polymerization. The reactor is typically charged from an inerted stirred feed tank which contains the reaction mixture. Inerting, although not required, typically removes oxygen by flushing the reactor with an inert gas, such as nitrogen, argon, or helium. After the initial filling of the reactor to the desired preselected level and polymerizing the charged reaction mixture to approximately the desired solids content, the volume of reaction mixture charged thereto is typically adjusted to a value to maintain such preselected level of liquid in the reactor. Thereafter, the liquid mixture of unsaturated reaction product is typically withdrawn from the reactor, to maintain the preselected level of such liquid mixture in the reactor.

Polymerization conditions are continuously maintained in the reactor in certain embodiments to produce a LR polymer of selected molecular weight and selected degree of conversion. Reactors can be operated so as to produce a LR polymer concentration from as low as about 1 percent to as high as 100 percent by weight. The level of filling of the reactor can vary from as low as 10 percent to as high as 100 percent of usable volume and may be controlled by any desired means, for example, a level controller and associated valve or pump in the transfer line from the reactor.

In an other embodiment of the present invention, the process for preparing a liquid rubber composition for toughening a cured thermoset resin is provided as described above, except that no aromatic-containing initiator is required. In this embodiment, the reaction mixture containing primarily monomer and solvent is thermally-initiated. Thermal initiation arises from the thermal instability of many monomers and solvents upon which their thermal degradation drives the formation of polymeric reaction products. This embodiment includes the steps of: forming a reaction mixture comprising from 0.1 to 99.9 weight percent of at least one $C_1$–$C_{20}$ alkyl acrylate monomer and from 0.1 to 99.9 weight percent of at least one aromatic-containing solvent; charging the reaction mixture into a reactor maintained at a reaction temperature within the range of from 200° C. to 400° C.; thermally-initiating polymerization of the monomer; and providing a reaction residence time in the range of from 1 minute to 1000 minutes.

Various processes are capable of providing the single phase uncured thermoset compositions of the present invention. Typically, the LR polymers prepared according to the present invention are suitably mixed with uncured liquid thermoset resins using any conventional type liquid mixing device known in the art.

For preparing toughened rigid thermoset resin materials and composites, the weight percentage of the LR in the LR/thermoset resin blend is at least 1.0 weight percent, typically at least 2.0 weight percent, and more typically at least 5.0 weight percent, and typically no more than 25 weight percent, more typically no more than 15 weight percent, and most typically no more than 10 weight percent.

Soft and flexible thermoset resin materials and composites (compared relatively to those described in the preceding paragraph) can also be prepared when the weight percentage of the thermoset resin in the LR/thermoset resin blend is at least 10.0 weight percent, typically at least 20.0 weight percent, and more typically at least 30.0 weight percent, and typically no more than 75 weight percent, more typically no more than 60 weight percent, and most typically no more than 50 weight percent.

Many of the commercially available thermoset resins which can be used in the present invention include: alkyd resins, allyl diglycol carbonate resins, diallyl isophthalate resins, diallyl phthalate resins, melamine resins, melamine/phenolic resins, phenolic resins, vinyl ester resins; epoxy resins; unsaturated polyester resins; cyanoacrylate resins; melamine-formaldehyde resins; polyurethane resins; polyimide resins; polyphenol resins; and combinations thereof. While any of these thermoset resins can be used to prepare miscible resin formulations with the LRs of the present invention, the LRs are typically miscible in unsaturated polyester resins, vinyl ester resins, and epoxy resins.

EXAMPLES

General Procedure for Preparing Liquid Rubbers

Liquid rubbers based on rubbery acrylic acrylate copolymers were prepared by the following general procedures.

Liquid rubbers for preparing single phase uncured thermoset compositions were prepared by free radical polymerization. The polymerizations were carried out in a continuous flow stirred tank reactor (CFSTR) or a Plug Flow Tubular Reactor (PFTR). The polymerization reaction mixtures used toluene and the aromatic-containing initiator 3,4-dimethyl-3,4-diphenylbutane to provide for non-functional aromatic end groups on the liquid rubber polymer chains.

In the CFSTR procedure, monomers, solvents, and initiators were fed into a mixing vessel and subsequently pumped and filtered into a CFSTR.

The monomers, initiator, and solvent were typically mixed and fed into a glass vessel which was purged with nitrogen. After purging, the mixture was degassed and kept under a nitrogen blanket. The mixture was then pumped at a rate of 12 g/minute through a series of filters into a 600 ml CFSTR in which the monomers were copolymerized to yield the liquid rubber polymer product. The reaction conditions were as follows: Temperature: 260–300; Pressure: 300–800 psi; Reactant Flow Rate: 10–15 g/min.; Residence Time in Reactor: 40-60 minutes. Monomer to polymer conversion was typically 92–95 weight percent. Residual monomer and solvent were removed by vacuum devolatilization.

Liquid rubber polymers were also synthesized in a PFTR by a high temperature and pressure. The PFTR was a 4 meter by 1.5 mm cylindrical stainless steel tube, of 1.1 mm inner diameter. The tube formed the secondary coil of a transformer and as a result, heat was supplied to it inductively. The process variables were: flow rate (2–5 ml/min.), pressure (3500 psi), temperature (300 C), initiator concentration (2–4% based on the weight of monomer). The initiators used were: 3,4-Dimethyl-3,4-diphenylhexane or 2,3-Dimethyl-2,3-diphenylbutane. The monomer concentration, in the reaction mixture, was at least 10 percent by the weight of the solvent toluene.

The following ASTM Tests were used to evaluate the mechanical properties of cured thermoset test panels:

| Property: | ASTM TEST |
|---|---|
| Kic and Gic | D 5045-96 |
| Tensile Modulus | D 638 |
| Flexural Modulus | D 790 |
| Deflection Temperature Under Load (HDT) | D 648 |

Example 1

A liquid rubber polymer comprising non-functional aromatic end groups and a BA/MATS/Acrylamide chain units in the weight ratio of 93/5/2 was prepared in toluene solvent (48% by weight of total feed concentration was solvent), by the CFSTR polymerization process given above. An aromatic-containing polymerization initiator, 3,4-dimethyl-3,4-diphenylbutane, was used at 4% based on the weight of monomer. The resulting liquid rubber had a molecular weight of 1,347 daltons and polydispersity of 2.3.

Seven hundred and sixty (760) grams of a bisphenol-A epoxy based vinyl ester thermosetting resin, DERAKANE 411-C-50 (Dow Chemical Company), was combined with 40 grams of the liquid rubber of this example. This mixture of vinyl ester resin mixture and liquid rubber (5 weight percent liquid rubber based on total) was transparent, indicating that a single phase uncured thermoset composition had been prepared.

The single phase uncured thermoset composition was cured using 1.7% of a non-foaming peroxide catalyst, Trigonox 239A (Akzo Nobel) and 0.4% of a reducing agent, cobalt naphthenate (6% Co and 53% mineral spirits) (Alfa Aesar). The uncured single phase mixture was charged to a resin kettle and sparged for 15 minutes with dry nitrogen. At the end of the 15 minutes period, the resin was placed under vacuum (635 mm Hg) and degassed for fifteen minutes. The promoter, cobalt naphthenate, was then added to the resin followed by vigorous mixing to yield a uniform mixture. This was followed by the initiator, Trigonox 239A.

This liquid mixture was subsequently degassed for 15 minutes to remove any entrained gas bubbles that resulted from the mixing process. Prior to curing, a closed aluminum metal panel mold was evacuated to a pressure of 635 mm Hg. The degassed mixture was injected into the mold with the aid of 50 psi back pressure. The resin was subsequently cured at room temperature for a minimum of 12 hours and post cured at 125 C for 1 hour in a forced air oven. After curing, solid panels of the cured toughened thermoset resin were removed from the molds and test pieces were cut for evaluation in accordance with the ASTM standard test procedures described above. The physical and mechanical properties of the cured solid panels are listed in Table I.

Example 2

Example 1 was repeated with the exception that the amount of the liquid rubber was increased from 5 weight percent to 10 weight percent based on total. The resulting uncured thermoset resin composition was transparent, indicating that a single phase uncured thermoset composition had been prepared. Panels were cured and tested according to Example 1. The physical and mechanical properties of the cured solid panels are listed in Table I.

Example 3

A liquid rubber having a composition of poly(BA/MMA/Acrylamide=94/5/1 weight ratio) was made according to the procedure in Example 1, with the exception that the toluene concentration comprised 31.6 weight percent of the reaction mixture and the amount of the aromatic-containing initiator was 2 weight percent based on total monomer. The liquid rubber thus obtained had a molecular weight of 1481 daltons and polydispersity of 1.7.

Blends of this liquid rubber (10 weight percent based on total) in DERAKANE 411-C-50 were transparent (single phase). Panels were cured and tested according to Example 1. The physical and mechanical properties of the cured solid panels are listed in Table I.

Comparative Example

A liquid rubber having a composition of (BA/MMA/Acrylamide=94/5/1 weight ratio) was made according to the procedure in Example 3, with the exception that a non-aromatic-containing initiator (di-tertiary butyl peroxide) was used instead of the aromatic-containing initiator. The liquid rubber thus obtained had a molecular weight of 1826 daltons and polydispersity of 1.8.

Blends of this liquid rubber (10 weight percent) in DERAKANE 411-C-50 were opaque (phase separated, not single phase). Panels were cured and tested according to Example 1. The physical and mechanical properties of the cured solid panels are listed in Table I.

Example 4

A liquid rubber having a composition of poly(BA=100) was made according to the procedure in Example 3 (here, no comonomers were used). The liquid rubber thus obtained had a molecular weight of 1234 daltons and polydispersity of 2.3.

Blends of this liquid rubber (10 weight percent based on total) in DERAKANE 411-C-50 were transparent (single phase). Panels were cured and tested according to Example 1. The physical and mechanical properties of the cured solid panels are listed in Table I.

Example 5

A liquid rubber having a composition of poly(BA/MATS/Acrylamide=93/5/2 weight ratio) was prepared in toluene solvent (48% by weight of total feed concentration was solvent), by the plug flow tube solution polymerization process given above. An aromatic-containing polymerization initiator, 3,4-dimethyl-3,4-diphenylbutane, was used at 4 weight percent based on total weight of monomer. The resulting liquid rubber had a molecular weight of 2,009 daltons and polydispersity of 3.6.

Blends of this liquid rubber (7.5 weight percent based on total) in a bisphenol-A epoxy based vinyl ester thermosetting resin (DERAKANE 411–400, Dow Chemical Company) were transparent (single phase). Panels were cured and tested according to Example 1. The physical and mechanical properties of the cured solid panels are listed in Table I.

Example 6

Example 5 was repeated with the exception that the amount of the liquid rubber was increased from 7.5 weight percent to 20 weight percent based on total. The resulting uncured thermoset resin composition was transparent, indicating that a single phase uncured thermoset composition had been prepared. Panels were cured and tested according to Example 1. The physical and mechanical properties of the cured solid panels are listed in Table I.

Example 7

A liquid rubber having a composition of poly(BA/MMA/MATS/Acrylamide=47/47/5/1 weight ratio) was made according to the polymerization procedure in Example 3. The liquid rubber thus obtained had a molecular weight of 1069 daltons and polydispersity of 1.4.

Blends of this liquid rubber (10 weight percent based on total) in unsaturated polyester type resins were transparent (single phase). A resin mixture comprising the liquid rubber toughener, unsaturated isophthalic acid based styrenated type polyester thermosetting resin, AROPOL 7334-T15 (ASHLAND Chemical Company), 1.70% of a peroxide catalyst, Lupersol DDM 9 (methyl ethyl ketone peroxide (MEK)) (Akzo Nobel), 0.4% of a reducing agent, cobalt naphthenate (6% Co and 53% mineral spirits) (Alfa Aesar) and 0.2% diethylaniline was prepared and cured into test panels according to Example 1. The physical and mechanical properties of the cured solid panels are listed in Table I.

TABLE 1

Properties of Thermoset Resin Blend

| Example No.: | Ref | 1 | 2 | 3 | Comp | 4 | Ref | 5 | 6 | Ref | 7 |
|---|---|---|---|---|---|---|---|---|---|---|---|
| Components, % | | | | | | | | | | | |
| DERAKANE 411-C-50 | 100 | 95 | 90 | 90 | 90 | 90 | | | | | |
| DERAKANE 411-400 | | | | | | | 100 | 92.5 | 80 | | |
| AROPOL 7334-T15 | | | | | | | | | | 100 | 90 |
| Liquid Rubber | 0 | 5 | 10 | 10 | 10 | 10 | 0 | 7.5 | 20 | 0 | 10 |
| Appearance of Uncured Liquid Blend | NA | clear | clear | clear | opaque | clear | NA | clear | clear | NA | clear |
| Modulus | | | | | | | | | | | |
| Tensile, [GPa] | 3.07 | 2.88 | 2.44 | 2.48 | 2.37 | 2.84 | 3.28 | 2.90 | 2.18 | 3.56 | 2.95 |
| Flexural, [GPa] | 3.13 | 3.23 | 2.85 | 2.92 | 2.74 | 2.98 | 3.13 | 2.71 | 2.25 | 3.56 | 2.94 |
| Fracture Toughness | | | | | | | | | | | |
| $Kic^{1/2}$, [MPam] | 1.35 | 1.21 | 1.52 | 1.66 | 1.43 | 1.19 | 1.00 | 0.99 | 1.71 | 0.88 | 1.66 |
| Gic, [J/m$^2$] | 222 | 203 | 387 | 365 | 343 | 190 | 105 | 237 | 447 | 111 | 304 |
| Heat Distortion Temp. | | | | | | | | | | | |
| Unannealed, °C. | 105 | 87.7 | 83.8 | 78.5 | 86.7 | 72 | 107 | 95.8 | 75.3 | 92.7 | 70.5 |
| Annealed, °C. | 104 | 92.1 | 87.1 | 82.3 | 89.5 | 73.5 | 107 | 99.5 | 79.7 | 92.8 | 69.5 |

I claim:

1. A process for preparing a liquid rubber composition for a cured thermoset resin, wherein said liquid rubber composition is characterized as being miscible in the uncured state of said thermoset resin and immiscible in the cured state of said thermoset resins, said liquid rubber composition comprising polymer chains having at least one non-functional aromatic terminal end-group, a weight average molecular weight of at least 1069 g/mol, a glass transition temperature less than −40° C., the process comprising the steps of:

(a) forming a reaction mixture, said reaction mixture comprising:

(i) from 1.0 to 99.999 weight percent of the reaction mixture of at least one $C_1$–$C_{20}$ alkyl acrylate monomer; and (ii) from 0.001 to 20 weight percent of the reaction mixture of at least one aromatic-containing initiator selected from the group consisting of alkyl-substituted diphenyl compounds having the following general structure:

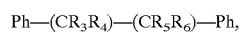

Ph—(CR$_3$R$_4$)—(CR$_5$R$_6$)—Ph, wherein Ph are separately phenyl groups, and $R_3$, $R_4$, $R_5$, and $R_6$ each represent a hydrogen or an alkyl group, at least two of $R_3$, $R_4$, $R_5$, and $R_6$ being alkyl groups, and the phenyl groups are unsubstituted or contain alkyl substituents;

(b) charging the reaction mixture into a reactor maintained at a reaction temperature of from 200° C. to 300° C.;

(c) initiating polymerization of said monomer with said aromatic-containing initiator to form a reaction product containing said polymer chains; and (d) providing a reaction residence time sufficient for the polymer chains to form.

2. A process according to claim 1, wherein the reaction mixture comprises at least 10 weight percent of a $C_1$ to $C_{20}$ alkyl acrylate monomer.

3. A process according to claim 1, wherein the reaction mixture comprises at least 0.05 weight percent of at least one aromatic-hydrocarbon free-radical initiator.

4. A process according to claim 1, wherein the reaction mixture further comprises at least 0.1 weight percent of at least one aromatic-containing solvent.

5. A process according to claim 1, further comprising the step of terminating said polymerization of polymer chains with at least one of the following: residues of one or more aromatic-containing initiator molecules; aromatic-containing chain transfer agents; aromatic-containing terminating agents; and chain coupling agents.

6. A process for preparing a liquid rubber composition for a cured thermoset resin, wherein said liquid rubber composition is characterized as being miscible in the uncured state of said thermoset resin and immiscible in the cured state of said thermoset resins, said liquid rubber composition comprising polymer chains having at least one non-functional aromatic terminal end-group, a weight average molecular weight of at least 1069 g/mol, a glass transition temperature less than $-40°$ C., the process comprising the steps of:

(a) forming a reaction mixture, said reaction mixture comprising:
  (i) from 1 to 99.999 weight percent of the reaction mixture of at least one $C_1$–$C_{20}$ alkyl acrylate monomer; and
  (ii) from 0.00 1 to 99 weight percent of the reaction mixture of at least one aromatic-containing solvent;

(b) charging the reaction mixture into a reactor maintained at a reaction temperature within the range of from $200°$ C. to $300°$ C.;

(c) thermally-initiating polymerization of said monomer to form a reaction product containing said polymer chains; and (d) providing a reaction residence time sufficient for the polymer chains to form.

7. A process according to claim 6, wherein the reaction mixture comprises at least 10 weight percent of a $C_1$ to $C_8$ alkyl acrylate monomer.

8. A process according to claim 6, wherein the reaction temperature is within the range of from $260°$ C. to $300°$ C.

* * * * *